United States Patent [19]

Whyte

[11] Patent Number: 4,859,335
[45] Date of Patent: Aug. 22, 1989

[54] FLUID FILTERING SYSTEMS

[75] Inventor: Jon F. R. Whyte, Cheltenham, United Kingdom

[73] Assignee: Dowty Mining Machinery Limited, Cheltenham, England

[21] Appl. No.: 154,016

[22] Filed: Feb. 9, 1988

[30] Foreign Application Priority Data

Feb. 26, 1987 [GB] United Kingdom ............... 8704582

[51] Int. Cl.⁴ .................... B01D 35/16; B01D 46/04
[52] U.S. Cl. ................................ 210/393; 210/333.1; 210/411; 210/415; 55/294; 55/302; 55/213
[58] Field of Search ............... 55/294, 213, 302, 354; 210/393, 409, 411, 415, 333.01, 333.1, 412, 355

[56] References Cited

U.S. PATENT DOCUMENTS

| | | | |
|---|---|---|---|
| 2,513,420 | 7/1950 | McNamara | 55/294 |
| 3,487,609 | 1/1970 | Caplan | 55/294 X |
| 3,568,414 | 3/1971 | Spriggs et al. | 55/294 |
| 4,481,021 | 11/1984 | Kinney et al. | 55/294 X |
| 4,632,757 | 12/1986 | Rosenberg | 210/411 |
| 4,655,049 | 4/1987 | Andrews et al. | 55/213 X |
| 4,655,799 | 4/1987 | Bosworth et al. | 55/294 X |

Primary Examiner—Charles Hart
Attorney, Agent, or Firm—Young & Thompson

[57] ABSTRACT

A fluid filtering system which includes a fluid filtering unit having a localized cleaning arrangement. The fluid filtering unit comprises a filter element through which the fluid being filtered is passed and structure for cleaning the filter element without interruption of the filtering operation of the unit. The cleaning structure includes a cleaning head which ejects fluid under pressure and which is moveable relative to the filter element to bring about localized cleaning of the element. Preferably, the filter element is moved, by an hydraulic arrangement to bring about localized cleaning over the whole of the filter element.

13 Claims, 5 Drawing Sheets

FLUID FILTERING SYSTEMS

This invention relates to fluid filtering systems and units therefor and in particular, to the cleaning of the filtering element of such units.

In commonly used types of fluid filtering systems two similar filter units are arranged in parallel so that when one unit is in service the other one is out of service, enabling the latter to be cleaned, and vice versa. The cleaning of a filter unit out of service is often effected by back-flushing of the filter element with a high pressure fluid, suitable means for doing this being provided in each filter unit. The high pressure fluid used in the cleaning may be derived from the clean side of the system or from an independent source, and in the latter case the high pressure fluid may be different from the fluid being filtered.

Systems having two or more filter units in which one unit only is in service at any one time are common and can be cleaned in a similar manner. In these types of systems the out of service filter units are at different stages in the cleaning cycles, and will come into service in strict rotation.

The provision of back-flushing means in each filter unit has proved to be costly, space consuming and leads to an increase of weight of the associated fluid filtration system. This is due to the duplication of equipment associated with this form of fluid filtration system.

In certain applications, the increase in weight and/or the space consumption will be considered to be a major problem, and this is certainly true in the aerospace and aircraft industries where weight and space are important.

The present invention is concerned with providing and efficient self cleaning filtering system which operates with a single filter unit, cleaning of which does not involve interrupting the flow of fluid being filtered.

According to the present invention a fluid filtering unit includes a filter element through which the fluid being filtered must pass and means for cleaning the filter element in situ without interruption of the filtration process, wherein the cleaning means comprises a cleaning head which is moveable relative to the filter element from which cleaning fluid issues at a pressure greater than that of the fluid being filtered to cause localised cleaning of the filter element.

Generally, the cleaning fluid is caused to flow through the filter element in the reverse direction to that of the flow of fluid being filtered.

As this type of filter unit, generally, does not have to be removed from service in order to effect cleaning of the filter element duplication of equipment is avoided.

The cleaning head advantageously includes a jet arrangement which may comprise any suitable fluid ejection system and which preferably is a rotating or a rotary jet system.

The jet arrangement is preferably mounted with respect to the filter unit so that the complete length of the filter element can be cleaned. In practice relative movement is effected between the jet arrangement and the filter element. This can be achieved by moving the filter element rather than the jet arrangement, and is the preferred practice.

In order to do this a drive means is provided, for example, electric motor or where possible a mechanical system. In a preferred embodiment a hydraulic dash-pot arrangement is used; the operation of this will be explained below.

In cases where the jet arrangement is moved relative to the filter unit a co-operating duct is preferably provided on the opposite side of the filter element to the jet arrangement which can be moved in conjunction with the jet arrangement. Such a duct can collect the cleaning fluid passing through the element and the filtered out solid washed from the filter element, and can therefore remove the resulting solution for treatment, either dumping or secondary separation prior to recycling.

The collecting duct need not form a fluid tight seal with the filter element, and therefore some of the fluid passing through the filter unit escapes into the collecting duct and is removed. If the cleaning fluid is extracted from the filtered fluid on the clean side of the filter unit, the fluid passing from the collecting duct may be recycled, so as to recover the cleaning fluid.

The filter unit may be operated on a continual cycle basis. However, it is, preferably provided with sensing means responsive to the degree of contamination of the filter element so that, when the filter is no longer in a condition suitable for further filtering, the cleaning means is brought into operation.

Such a sensing means preferably measures the pressure drop across the filter element caused by the contamination thereof, so that when this reaches a predetermined level the cleaning means is brought into operation. Preferably, the sensing means comprises a simple pressure balance which measures the pressure drop. Alternatively electronic sensors may be used and these can measure the pressure at any point in the system.

Preferably the filter unit has a cylindrical filter element and the cleaning means is positioned relative to the filter element so that it is caused automatically to move relative thereto during cleaning. During cleaning discharge of the cleaning fluid through the filter element in the direction opposite to normal filtering flow therethrough will occur, dislodging the contaminant particles from the filter element.

The filter element may be made from any suitable material. The specific type of material used will be dictated by the use to which the unit is to be put and the nature of the filtering solutions etc. If the unit is to be used to filter out large particles for example certain applications associated with the mining industry, a wire mesh grill filter element could suffice.

The advantages offered by the invention include the reduction in cost as a result of the use of only one filter unit and its associated cleaning means and attendant simplification of the filtration systems as a whole together with its automatic operation. Normally, it will only be necessary to inspect/maintain the filter element of this type of unit during the routine inspections of the associated equipment.

The invention will now be described, by way of examples, with reference to the accompanying drawings, in which.

Figure 1:
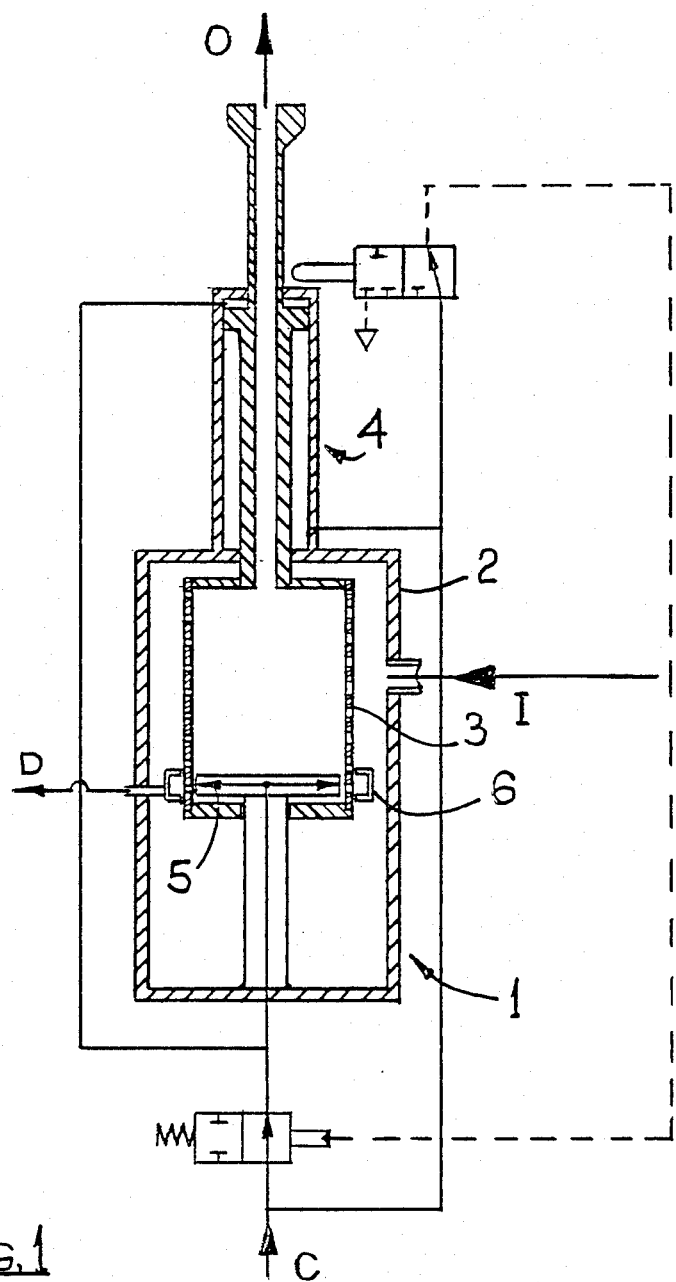
FIG. 1 is a diagrammatic representation of a preferred filter unit of the invention.
Figure 2:
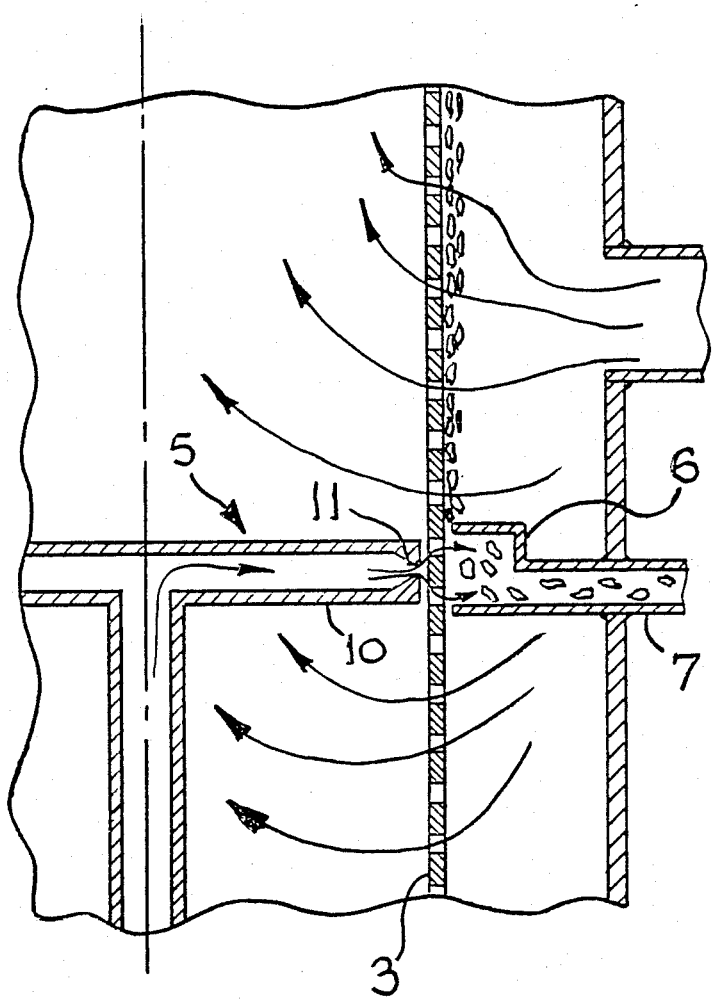
FIG. 2 is a schematic representation of the fluid flow lines in the filter unit shown in FIG. 1, during use thereof.

Referring to FIGS. 1 and 2, a filter unit 1 comprises a casing 2; a wire mesh filter element 3 connected to a dash-pot mechanism 4 for causing the filter element to move; and a rotary jet system 5 mounted so as to cause cleaning fluid to pass through the filter element in the opposite direction to the normal direction of flow of the fluid being filtered and having a collecting duct 6 to collect the used cleaning fluid.

The filter unit 1 is provided with a fluid inlet I and an outlet O, as well as a cleaning fluid inlet line C to the rotary jet system and a dump line D from the collecting duct 6.

The rotary jets eject fluid at a pressure greater than the fluid being filtered, so as to ensure effective cleaning of the filter element.

These rotary jets are eccentrically mounted in the head (not shown) and the ejection of the fluid provides the force required to rotate the head. In operation speeds of rotation of 2000 r.p.m. (revolutions/minute) are typical, thereby ensuring a efficient cleaning process across the whole surface of the filter element.

FIG. 2 shows a rotary jet 10 with a nozzle 11 and the relationship of the collecting duct 6 and the filter element 3 with the rotary jet system 5.

In operation of the unit the cleaning fluid is ejected through the nozzle 11 and against the filter element 3, so that it passes through and removes the contaminant from the filter element. The fluid is then collected in the collecting duct 6 and passed along the line 7 to dump.

Figure 3:
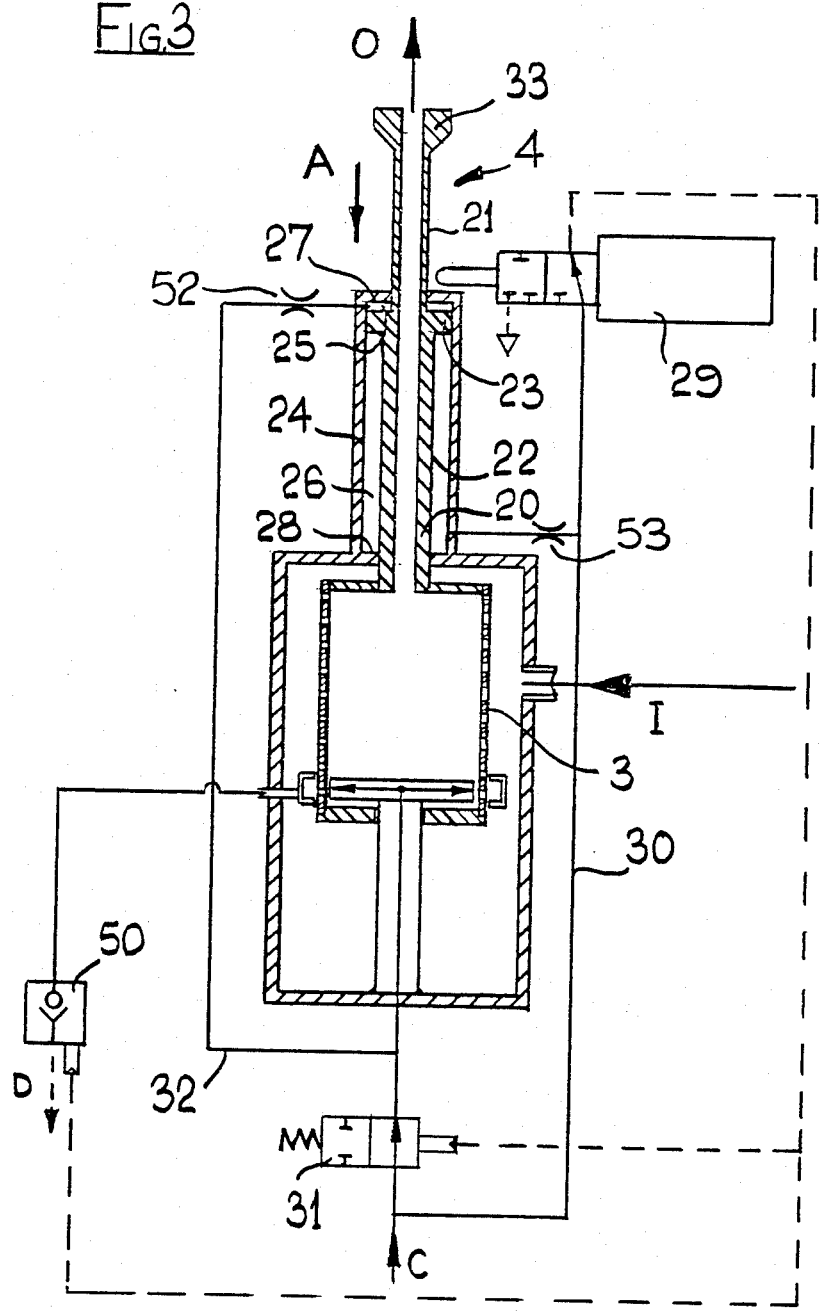
FIG. 3 is a schematic representation of the dashpot mechanism use with the filter unit of FIG. 1.

The dash-pot mechanism 4, as shown in FIG. 3, is of a type commonly used in industry and therefore only a brief explanation will be given. The mechanism comprises a hollow shaft 20, which can be divided into two sections 21,22 having different external diameters and being separated by a collar 23; and a casing 24 which is in sealing contact with the collar 23. A first space 25 is defined by the upper surface of collar 23, the adjacent casing wall 27 and the external surface of section 21 of the shaft 20 and a second space 26 is defined by the lower surface of the collar 23, the adjacent casing walls 28 and the external surface of section 22 of the shaft 20.

The cleaning fluid supply line C is directly connected to the space 26 and a pressure sensor valve 26 is incorporated in the line by means of a first bypass 30 taken from the cleaning fluid line prior to an on/off switch 31. In addition, a second bypass 32 directly connects the cleaning fluid supply line to the space 25, and this is taken from a point in the line subsequent to the switch 31.

In operation, the switch 31 is opened and cleaning fluid is allowed to flow to the rotary jets and along the bypass line 32 to the space 25. As a result of the difference in external diameters of sections 21 and 22 of the shaft 20 a pressure differential is caused between spaces 25 and 26. This pressure differential causes the shaft 20 to move in the direction A, thereby moving the filter element 3 relative to the rotary jet system 5.

The degree of travel of the shaft and hence the filter element is controlled by the engagement of lugs 33 provided on the end of the shaft 20 remote from the fluid filter with a shaft 34 of the valve 29.

Normally, the system would be designed so that in operation the movement of the filter element 3 relative to the rotary jet system 5 would take about ten seconds before the lugs 33 engage the shaft 34.

When the lugs 33 engage the shaft, the valve 29 is tripped resulting in the closure of the cleaning fluid supply switch 31. The cleaning fluid supplied to the space 25 is thereby cut off, and the pressure in this section of the line returns to the pressure in the fluid filter housing 2. The pressure differential between the spaces 25 and 26 is therefore reversed and the shaft 20 is caused to move in the reverse direction until the filter element is in the normal working position.

In operation the filter unit will work more efficiently if a drive is given to force the fluid to be filtered through the filter element. The drive can be supplied by a pump, and, to avoid unnecessary cost, the suction side of the pump performing a separate function can be used.

Figure 4:
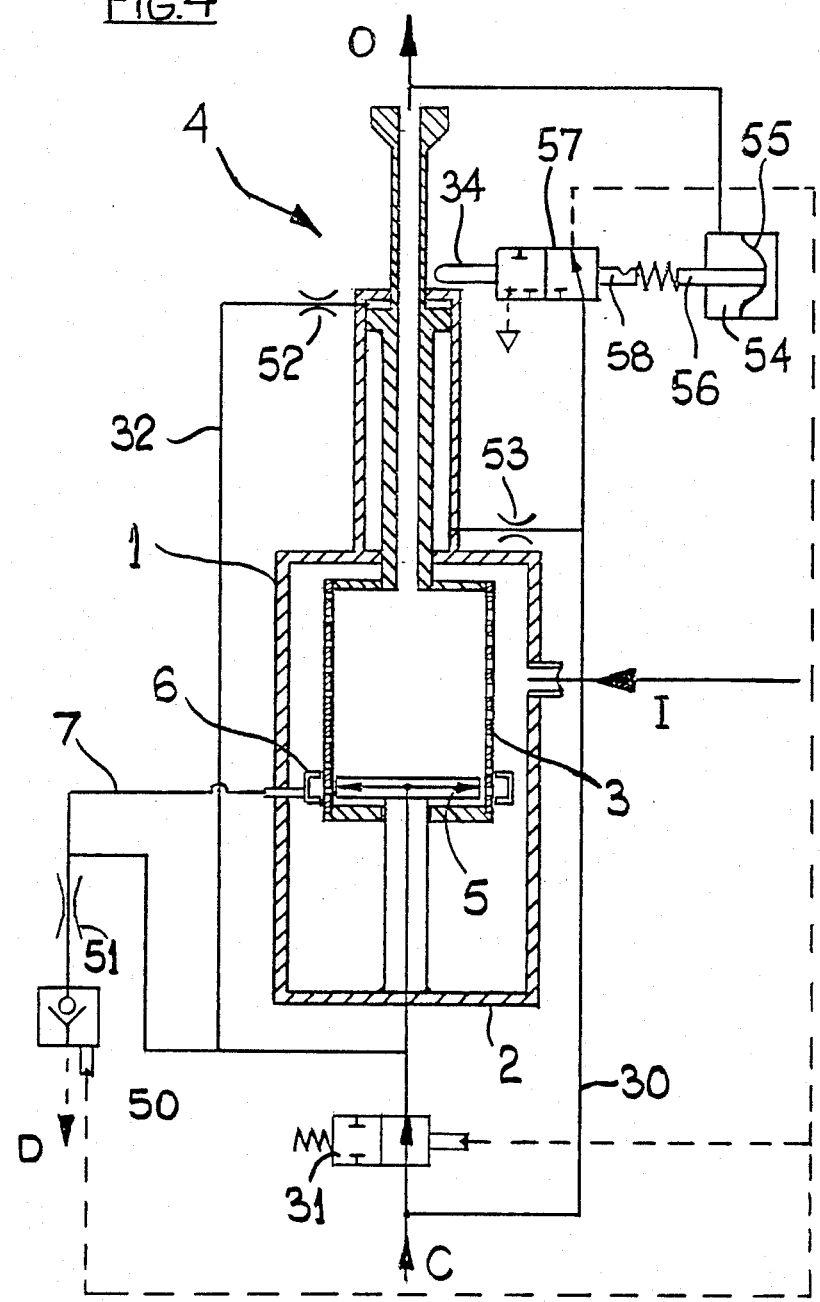
FIG. 4 is a schematic representation of the filter unit as shown in FIG. 1 adapted for use with a suction system.

FIG. 4 shows a flow diagram for such a suction system having a filtering fluid inlet I, and an outlet O, with the component parts of the dash-pot mechanism and filtering unit being as previously described.

The apparatus further comprises a dump valve 50 having a fluid mover 51 in the line 7; a restrictor 52 in the by-pass line 32, and a restrictor 53 in the by-pass line 30. The pressure sensor valve is hydraulically operated and comprises a diaphragm chamber 54 having a pliable member 55 and a rod 56; a snap action valve 57 having a shaft 34 for engagement with the dash-pot mechanism 4; a shaft 58 which is associated with the rod 56 of the diaphragm chamber 54, and a pressure storage device 59.

The pressure sensor valve is connected to the on/off switch 31 in the cleaning fluid line and the dump valve 50, so that when the degree of contamination has reached the required level and the valve is tripped the dump valve and on/off switch are opened.

The fluid mover 51 is provided in the dump line to ensure the level of dump of the cleaning fluid is adequate, thereby preventing back up of fluid in the filter unit.

The restrictors 52 and 53 are provided in the relevant by-pass lines to control the speed of travel of the shaft 20 of the dash-pot mechanism during cleaning.

Figure 5:
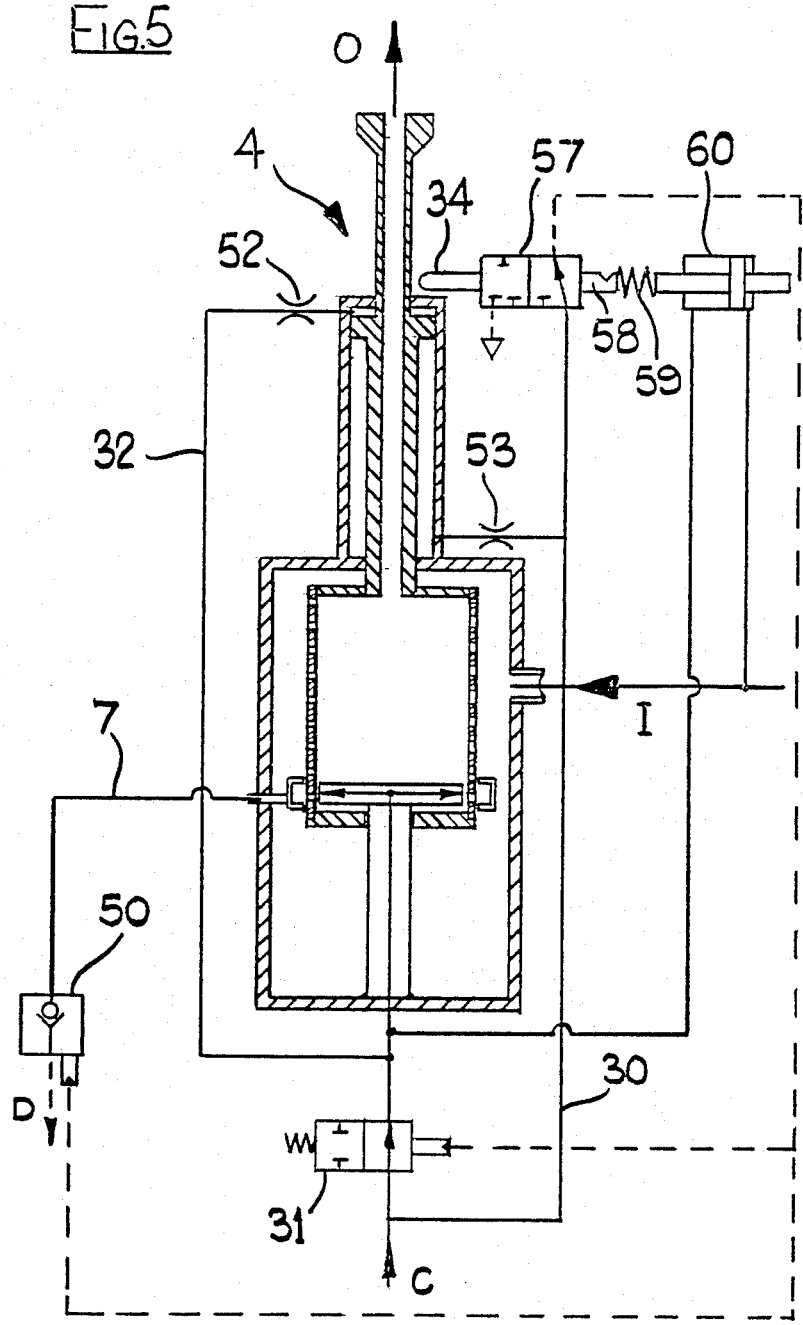
FIG. 5 is a schematic representation of the filter unit as shown in FIG. 1 adapted for use with a pressure system.

FIG. 5 shows a filter system which can be used in conjunction with a separate pump, i.e. one not performing a separate function and the configuration of this system is very similar to that with the suction system.

In this system, restrictors 52 and 53 are again provided in the by-pass lines 30 and 32 to control the travel of the dash-pot mechanism. No fluid mover is, however, required in the dump line as the pressure of the system is sufficient to prevent cleaning fluid back up.

The pressure sensor valve, dump valve and the on/off switch 31 are connected in a similar manner as with the suction system.

High pressures are being used in this system and therefore a diaphragm valve may not be suitable and the more robust ram and piston configuration 60 has been fitted. It is necessary to ensure that when the filter has been cleaned the ram and piston is reset. To do this the pressure drop across the filter element is measured between the filtering fluid inlet and the cleaning fluid inlet at a point subsequent to the on/off switch 31, the ram piston will therefore be reset during the cleaning cycle. The measurement of the pressure drop is possible between these two points as the pressure in the cleaning fluid supply line subsequent to the switch 31 will reduce to the pressure of the filter chamber by virtue of the rotary head arrangement venting in the filter unit.

What is claimed is:

1. A fluid filtering unit including a filter element through which the fluid being filtered must pass and means for cleaning the filter element in situ without interruption of the filtration process, which cleaning means comprises a cleaning head and a co-operating collection duct, one of said cleaning head and collection duct, on the one hand, and said filter element, on the other hand, being movable relative to the other of said cleaning head and collection duct, on the one hand, and said filter element, on the other hand, wherein cleaning fluid issues from the cleaning head at a pressure greater than that of the fluid being filtered so to cause localized cleaning of the filter element, and is collected in the co-operating collection duct and passed to waste.

2. A fluid filtering system as claimed in claim 1, wherein the cleaning head includes a jet arrangement having a suitable fluid ejection system.

3. A fluid filtering system as claimed in claim 2, wherein the cleaning head is a rotating or a rotary jet system.

4. A fluid filtering system as claimed in claim 1, wherein the jet arrangement is mounted with respect to the filter unit so that the complete length of the filter element can be cleaned.

5. A fluid filtering system as claimed in claim 4, wherein cleaning is effected by moveing the filter element, so as to bring about relative movement therebetween.

6. A fluid filtering system as claimed in claim 5, in which the filter element is moved by a hydraulic dashpot arrangement.

7. A fluid filtering system as claimed in claim 1, which further comprises a sensing means responsive to the degree of contamination of the filter element so that, when the filter is no longer in a condition suitable for further filtering, the cleaning means is brought into operation.

8. A fluid filtering system as claimed in claim 7, in which the sensing means comprises a simple pressure balance which measures the pressure drop.

9. A fluid filtering system as claimed in claim 7, in which electric sensors are used which can measure the pressure at any point in the system.

10. A fluid filtering system as claimed in claim 1, wherein the cleaning head and collection duct are disposed in registry with each other on opposite sides of the filter element.

11. A fluid filtering system as claimed in claim 10, which further comprises an inlet in the filtering unit and an outlet for fluid filtered in the filtering unit, said inlet and said collection duct being both disposed on one side of the filter element and said cleaning head and said outlet being both disposed on the other side of the filter element, whereby fluid moving from said cleaning head to said collection duct passes through the filter element in the direction opposite the direction in which fluid to be filtered passes through the filter element from the inlet to the outlet.

12. A fluid filtering system as claimed in claim 11, wherein said filter is cylindrical and said cleaning head is disposed within said filter and said collection duct is annular and is disposed surrounding said filter, the relative movement of the cleaning head and collection duct, on the one hand, and the filter element, on the other hand, taking place in the axial direction of the cylindrical filter element.

13. A fluid filtering system as claimed in claim 12, wherein the cylindrical filter element moves between the cleaning head and the collection duct, the cleaning head and collection duct remaining in registry with each other during movement of the filter element therebetween.

* * * * *